Figure 1:
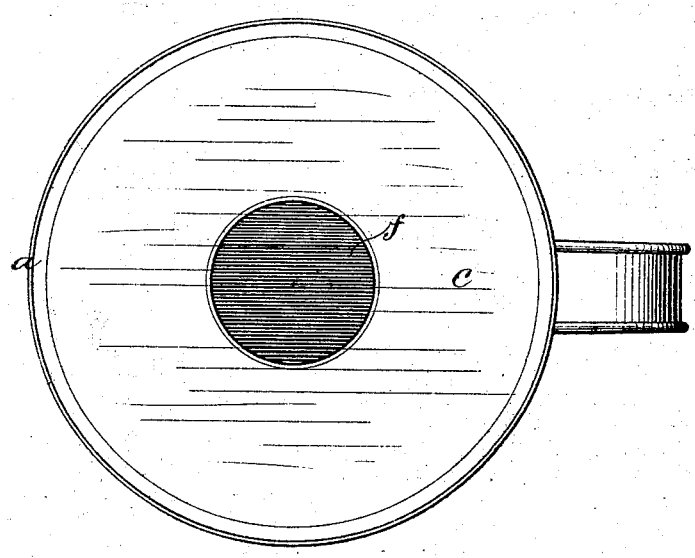

Edward Victor.
Fly Trap.

No. 117489.  Patented Jul 25 1871.

Witnesses.
C. F. Brown
C. O. Brown

Edwd Victor
Inventor, by
Geo. E. Brown
Atty.

UNITED STATES PATENT OFFICE.

EDWARD VICTOR, OF FORT BRANCH, INDIANA, ASSIGNOR TO HIMSELF AND JACOB D. SKELTON, OF SAME PLACE.

IMPROVEMENT IN FLY-TRAPS.

Specification forming part of Letters Patent No. 117,489, dated July 25, 1871.

*To all whom it may concern:*

Be it known that I, EDWARD VICTOR, of Fort Branch, Gibson county, Indiana, have invented an Improved Fly-Trap, of which the following is a specification, in the drawing of which—

Figure 2:
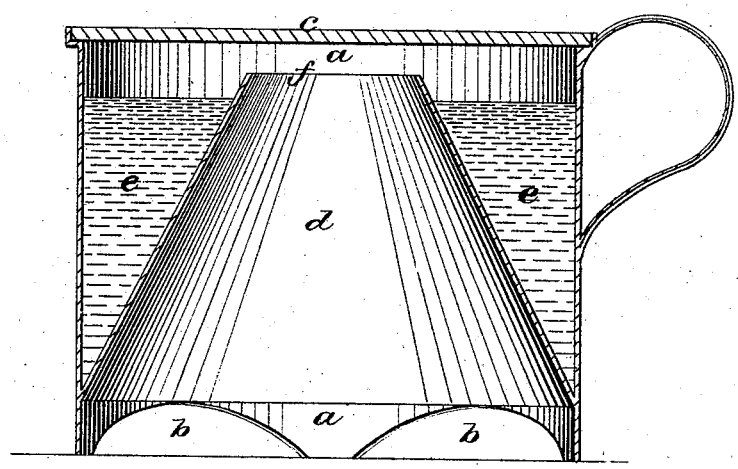

Figure 1 is a top view, and Fig. 2 a vertical section.

This invention consists in the combination of a cylindrical vessel, open at its bottom and furnished with a flat glass cover laid across its top, and having notches at its lower end, with a hollow truncated cone secured at its base to the inside of the cylindrical vessel above the aforesaid notches, and terminating at its upper open end at any suitable point short of the glass cover, all for the purpose of trapping flies, in the manner hereinafter set forth.

Referring to the drawing, $a$ is the cylindrical vessel; $b$, the notches around its lower end; $c$, the glass cover; and $d$, the truncated cone. The annular space $e$ between the cone and cylinder forms a reservoir to hold water or other liquid. If a dish containing any sort of food of which flies are especially fond be placed within the vessel under the cone, the flies allured thereto will pass through the notches $b$, and after eating their fill will naturally, being attracted by the light, fly upward through the opening $f$ at the top of the cone and dash themselves against the top of the trap, by which they will be thrown downward into the reservoir $e$, wherein they will be drowned. The reservoir can be emptied by simply removing the cover and inverting the vessel.

I claim as my invention—

The combination of the cylindrical vessel $a$, notches, $b$ flat glass cover $c$ laid horizontally upon the top of the cylinder, and the truncated cone $d$ having the opening $f$ at its top and so placed that its bottom is above the notches $b$ and its top below the cover $c$, and the reservoir $e$ is formed between it and the vessel $a$, as specified.

EDWARD VICTOR.

Witnesses:
J. M. FOSTER,
LOUIS GRIM.